(12) United States Patent
Lehman

(10) Patent No.: US 11,443,549 B2
(45) Date of Patent: Sep. 13, 2022

(54) APPARATUS, SYSTEM, AND METHOD OF PROVIDING A FACIAL AND BIOMETRIC RECOGNITION SYSTEM

(71) Applicant: Josh Lehman, Las Vegas, NV (US)

(72) Inventor: Josh Lehman, Las Vegas, NV (US)

( * ) Notice: Subject to any disclaimer, the term of this patent is extended or adjusted under 35 U.S.C. 154(b) by 0 days.

(21) Appl. No.: 16/924,693

(22) Filed: Jul. 9, 2020

(65) Prior Publication Data
US 2021/0150186 A1 May 20, 2021

Related U.S. Application Data

(60) Provisional application No. 62/871,882, filed on Jul. 9, 2019.

(51) Int. Cl.
*G06V 40/16* (2022.01)
*G01J 5/00* (2022.01)
*G06V 40/50* (2022.01)

(52) U.S. Cl.
CPC .......... *G06V 40/166* (2022.01); *G01J 5/0025* (2013.01); *G06V 40/171* (2022.01); *G06V 40/172* (2022.01); *G06V 40/50* (2022.01)

(58) Field of Classification Search
CPC ........... G06K 9/00255; G06K 9/00281; G06K 9/00288; G06K 9/00926; G06K 9/00771; G06K 9/00362; G06K 9/00; G06K 9/00228; G06K 9/00261; G06K 9/00335; G06K 2009/00322; G06K 2009/00939; G06K 9/00221; G06K 9/2018; G01J 5/0025; G08B 13/19656; G08B 13/19602; G08B 13/196; G08B 13/19628; G08B 15/002; G08B 3/10; G08B 5/36; H04N 7/186; H04N 5/33; A61B 5/01; A61B 2576/00; A61B 5/0035; A61B 5/0077; A61B 5/015; G07C 9/00; G07C 9/30; G07C 9/00563; G16H 50/30; G16H 50/80; G06V 40/166; G06V 40/171; G06V 40/172; G06V 40/50
See application file for complete search history.

(56) References Cited

U.S. PATENT DOCUMENTS

| | | | |
|---|---|---|---|
| 2004/0254472 A1* | 12/2004 | McQuilkin | A61B 5/015 600/473 |
| 2007/0189585 A1* | 8/2007 | Sukegawa | G06K 9/00885 382/118 |
| 2009/0092283 A1* | 4/2009 | Whillock | G06K 9/00771 382/103 |

(Continued)

*Primary Examiner* — Nimesh Patel
(74) *Attorney, Agent, or Firm* — Thomas J. McWilliams; Barnes & Thornburg LLP

(57) ABSTRACT

A facial recognition system, comprising: an automatically adjustable camera rig comprising a plurality of movable cameras, wherein the plurality of movable cameras are moved by a camera control platform according to take enrollment images; a first input for receiving images from the automatically adjustable camera rig; a second input for receiving a plurality of images from an comparative input; a first computing memory for storing a machine learning model that includes a three dimensional and a two dimensional comparison between the received first input and the received second input, wherein the comparison uses key facial points to compute a distance between the first input and the second input; and a match output in a case of a distance within a predetermined threshold.

3 Claims, 20 Drawing Sheets

(56) References Cited

U.S. PATENT DOCUMENTS

| | | | |
|---|---|---|---|
| 2010/0172567 A1* | 7/2010 | Prokoski | A61B 5/418 382/132 |
| 2019/0236342 A1* | 8/2019 | Madden | G08B 13/19602 |
| 2020/0394419 A1* | 12/2020 | Takayanagi | G06K 9/00288 |
| 2021/0304537 A1* | 9/2021 | Reed | G06K 9/00281 |

* cited by examiner

Depth image

Point cloud

Mesh

APPARATUS, SYSTEM, AND METHOD OF PROVIDING A FACIAL AND BIOMETRIC RECOGNITION SYSTEM

CROSS-REFERENCE TO RELATED APPLICATIONS

This application claims priority to U.S. Provisional Application Ser. No. 62/871,882, entitled Apparatus, System and Method of Providing a Facial Recognition System and filed on Jul. 9, 2019.

BACKGROUND

Field of the Disclosure

The disclosure relates generally to facial and biometric recognition, and, more particularly, to an apparatus, system, and method of providing hardware and software for a facial and biometric recognition system.

Background of the Disclosure

For a variety of reasons, ranging from security to granting user access to enabling actuation of equipment, by way of example, Facial Recognition Systems [FRS] are being increasingly employed using available technologies. One of the most widely used solutions to provide FRS is the implementation of a feature extraction method based on Convolutional Neural Networks [CNN]. An additional solution has historically employed Multi-task Cascaded Convolutional Networks [MTCCN] for the detection of key markers in the face.

A widely known face dataset, Labeled Faces in the Wild [LFW], is often used as the benchmark against which facial recognition methods are tested and reported. Because FRS algorithms are typically based on machine learning (ML), of utmost importance to developing a FRS is the corresponding ML model generated during training.

The Ongoing Face Recognition Vendor Test, performed by NIST, is another benchmarking methodology. In this benchmarking, NIST tests a submitted algorithm against a number of datasets. The objective of the benchmarking discussed throughout is to assess the commercial readiness of a FRS product.

These benchmarkings typically vary the conditions of the acquired image to which the stored dataset images are compared. Such acquisition conditions may include, for example: varying lighting conditions; varying poses (i.e., the degree to which a face is rotated); and varying expressions (i.e., different emotions can impact facial landmarks). However, even benchmarkings typically do not account for varying age, for the reasons discussed throughout.

Therefore, the need exists for an improved apparatus, system and method of providing software and hardware for a facial recognition system.

SUMMARY OF THE DISCLOSURE

The embodiments include a facial recognition system, comprising: an automatically adjustable camera rig comprising a plurality of movable cameras, wherein the plurality of movable cameras are moved by a camera control platform according to take enrollment images; a first input for receiving images from the automatically adjustable camera rig; a second input for receiving a plurality of images from an comparative input; a first computing memory for storing a machine learning model that includes a three dimensional and a two dimensional comparison between the received first input and the received second input, wherein the comparison uses key facial points to compute a distance between the first input and the second input; and a match output in a case of a distance within a predetermined threshold.

The embodiments also include an identification and tracking system, comprising: a visual sensor; an infrared sensor synchronized with the visual sensor; a temporary identification assigner associated with the visual sensor and capable of assigning a temporary identification to faces perceived by the visual sensor; a facial feature assessment that applies a 3D mesh to the perceived faces to allow for the temporary identification, wherein the facial feature assessment assigns target zones of the perceived face that are suitably indicative of a body temperature of a person corresponded to the temporary identification; a body temperature assessment that uses the infrared sensor to assess the body temperature of the person corresponded to the temporary identification at the target zones; and an identification database that corresponds the temporary identification with the assessed body temperature and with additional information related to the person.

The additional information may include output from an algorithm that estimates at least one obstructed facial feature. The obstruction may comprise a mask.

Thus, the embodiments provide an improved apparatus, system and method of providing software and hardware for a facial recognition system.

BRIEF DESCRIPTION OF THE DRAWINGS

The disclosure is illustrated by way of example and not limitation in the accompanying drawings, in which like references may indicate similar elements, and in which.

DETAILED DESCRIPTION

Figure 1:
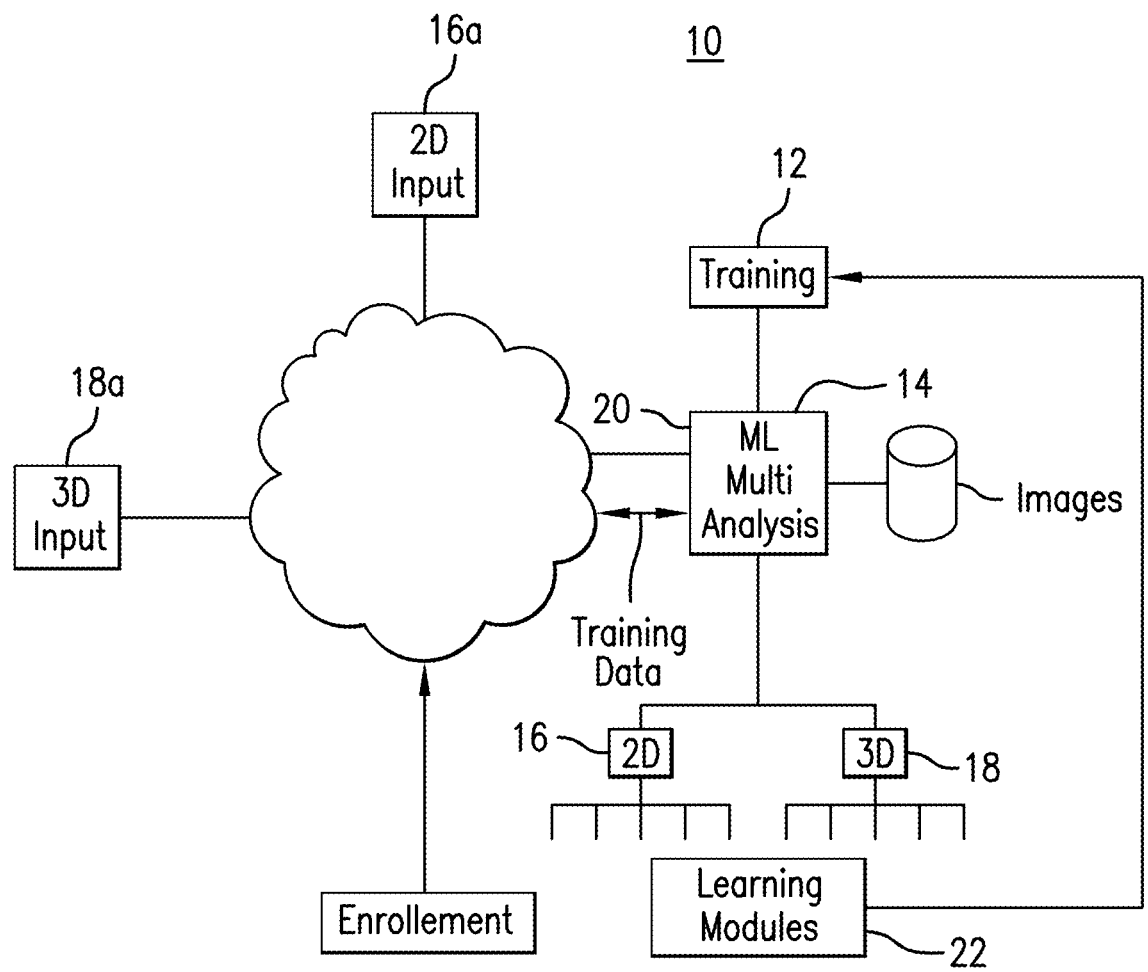
FIG. 1 is an illustration of an aspect of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform, transceive and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Thereby, the embodiments enable collecting, comparing and processing images to be used for facial recognition. Additionally, the embodiments enable the monitoring of biometrics, including temperature, of substantial numbers of people in a given space, such as in an airport or a store; and the assignment of an identification to ones of those people to allow for tracking across multiple sensing, i.e., camera, locations in that given space, and/or in other spaces. More specifically, the disclosed solution provides control as to how the images and sensing are enrolled and compared, resulting in better prediction and matching results. Parameters may be manually or automatically adjusted to yield exceptional results.

There are two kinds of mistakes that can be made during a FRS comparison: False Acceptance [FA], in which two faces of different people are accepted as the same; or a False Rejection [FR], in which two faces of the same person are rejected as a mismatch. That is, biometric FRS is based on a comparison of two faces, and the result of this comparison is a score of how close in likeness the two faces are.

A score within a given threshold determines whether a match is valid. A FRS is thus characterized by a receiver operating characteristic curve [ROC curve], on which both the FAR (false acceptance rate) and FRR (false rejection rate) are plotted.

Moreover, one may compute the accuracy of a FRS in the following way: accuracy=(TP+TN)/(TP+TN+FP+FN), where TP is true positive, TN is true negative, and FP, FN are false positive and false negative, respectively. However, accuracy is not a strong metric for a biometric system, since generally interest lies in controlling some of the parameters (FAR, i.e., FP; or FRR, i.e., FN). It should be noted that it is typically more important to minimize the FAR than the FRR.

It should also be noted that errors in identification increase with database size. Thus, the focus of the disclosure is model verification, and not identification as, if identification is analyzed, the FAR would have to be scaled along with the size of the comparative database.

The disclosed machine learning ("ML") model comprises those qualities that make it difficult to detect a face, or which increase the number of misidentified features, which leads to FA and FR (hereinafter "confusion factors"). For example, aging from the comparative image presents an important factor affecting the identification of facial landmarks; likewise, similarities in the features, hair or skin tones of particular racial groups may present misidentification difficulties. Other factors, such as environmental factors, such as lighting, can also hinder a model's ability to extract facial features/facial landmarks.

Moreover, this overcoming of confusion factors in the embodiments allows for detection and identification even in the event a face is sensed at off-angles, or with obstructions. By way of example, a facial obstruction may include glasses, a beard, or a face-mask worn responsive to the proliferation of an air-borne illness. Yet further, the detection in the embodiments then allows for tracking of the person associated with that obstruction (or that identifying biometric).

By way of example of known art, FaceNet is an open-source implementation of the face recognizer described in the paper "FaceNet: A Unified Embedding for Face Recognition and Clustering". The FaceNet project also uses ideas from the paper "Deep Face Recognition" from the Visual Geometry Group at Oxford. Using model verification (as opposed to identification) for the reasons discussed above, it appears that the VGG application of FaceNet yields high quality model accuracy results when applied to LFW. As such, one model employed in the embodiments disclosed herein may be based upon a VGG application of FaceNet, as modified as discussed throughout.

The disclosed ML model may initially add substantial image options, such as flipped images, to increase the data sample such as to allow for application of 2D and 3D analyses, as discussed further below. Application of these multiple analyses also helps alleviate FR and FA due to the confusion factors. The foregoing 2D and 3D "multi-analysis", in conjunction with a mean subtraction calculation, and with the usage of fixed image standardization, enables a 97.9% TAR (true acceptance rate) for a FAR (false acceptance rate) of 0.001, i.e., a FAR of only 1 in 1,000 identifications.

Of course, as is discussed further hereinbelow, the analysis and identification may not be made by way of comparison in the embodiments. Rather, a sensing may lead to an identification, and the identified person may then be assigned a generic and/or random identifier to allow for subsequent tracking of that person.

Yet further, in training the disclosed ML model, considerations are made as to forming the training set, the size of the final vectors, the metric used to compare the results, and the loss function. Moreover, biometrics fusion, also known as "Multi-Biometrics", wherein a number of biometrical information is combined to improve the results over that which a system obtains when using just one biometrical trait, may be employed. For example, the disclosed ML model approach may be based on several different images per individual. Such images may include, for example, not only the visual data, but additionally other biometric sensing, such as infrared data based on an IR sensing feature. Thereby, for example, an individual may be identified, assigned an identifier for subsequent tracking, and the identifier may be associated with other data, such as body temperature, all using the characteristics sensing and tracking provided in the embodiments.

A multi-analysis system 10 is illustrated in the embodiment of FIG. 1. Of note, the illustration includes a training aspect 12 to train a ML model 14 that incorporates a 2D 16 and a 3D analysis 18; baseline rules 20 to improve the combined multi-analysis; and learning modules 22, each of which may be dedicated to one or more of the confusion factors.

Figure 2:
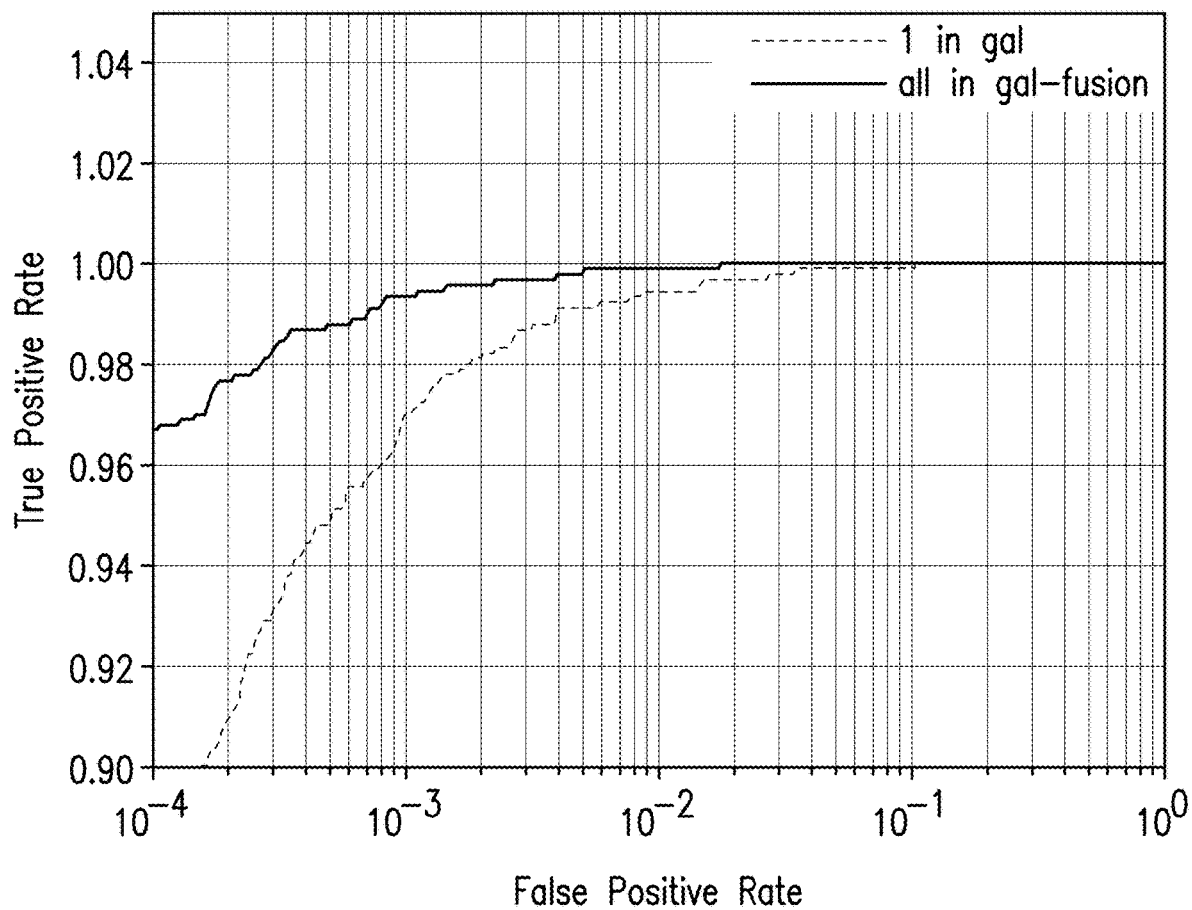
FIG. 2 is an illustration of aspects of the embodiments.

FIG. 2 graphically shows the ROC for two tests using the LFW dataset: one using just one image in the gallery (bottom line); and the other using all the available images per individual, 3 on average (top line). The results of FIG. 2 illustrate, in particular for targeting low FPR rates, the benefits of the multi-analysis fusion in the disclosed FRS model: for the same FPR of 0.001, the TPR (true positive rate) is improved from 97% (considering just one image) to 99.4% (considering all the images). Moreover, the foregoing allows for identification and/or comparative identification of even an obstructed face, based on its multi-point analysis.

Testing of the disclosed ML model may include analyzing identification, using a 1 to N comparison based in the same model demonstrating the improved verification referenced above. More particularly, the FPR (people not in the database identified as being in it) is N×FPR, where N is the number of persons in the DB and FPR is the False Positive Rate. For example, using a FaceNet base model as referenced above (FPR@0.1% produce a TPR of ~98.6%), FPR=N×0.001—meaning, if the database size is 1000, there should be one false identification.

One of the most important issues, i.e., confusion factors, that affects the identification accuracy of 2D face recognition systems is the change in the pose of a person with respect to the camera. However, one of the biggest differences between 2D and 3D face recognition is the need for substantial additional data acquisition processes and devices, preferably without a significant increase in processing time.

In particular, 3D face acquisition may require specialized hardware. 3D face data acquisition methods may be active or passive. Moreover, 3D face data acquisition may be keyed in the embodiments to particular, detectable facial features 102$a$, $b$, $c$, which may serve as the base points for the 3D analysis of the comparison dataset when applied to the acquired real time data, such as datasets regarding different poses 104$a$, 104$b$, 104$c$. Each data set may indicate a time of data acquisition (t1, t2), underlying data (R1, R2), and an identification of the sensor (C1, C . . . ) that obtained the data. This is illustrated with particularity in FIG. 3.

Figure 4A:
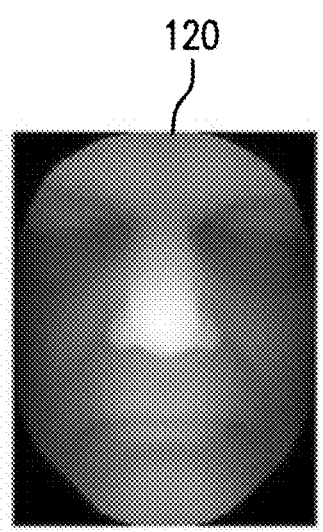
FIG. 4A is an illustration of an aspect of the embodiments.
Figure 4B:
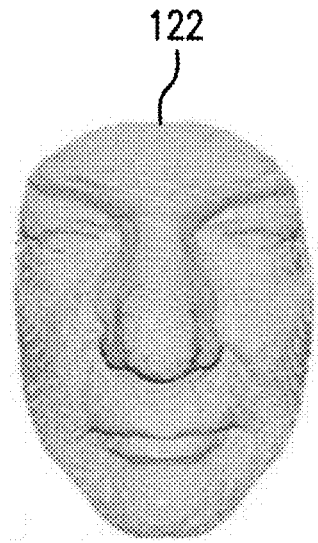
FIG. 4B is an illustration of an aspect of the embodiments.
Figure 4C:
FIG. 4C is an illustration of an aspect of the embodiments.

More specifically, 3D data may be processed as different data representations based on the base points as assessed in a given representation type. By way of example, the processed facial data may be interpreted in one or more of three unique formats, as illustrated in FIG. 4: i.e., as a depth image 120, a point cloud 122, or a mesh 124. Yet further, it is the use of these multi-point analyses that allows for the embodiments to sense identifying facial features even with obstructions, such as a mask or multiple off-angle views.

Acquisition of the data for this 3D comparison may occur via a dedicated 3D scan device used for enrollment to provide data for later identification. For example, an iPhone X lock screen may use enrollment data for each login using structured light to generate a 3D shape. However, most cases may not have a 3D enrollment image to compare or query against. Therefore, the disclosed model may use techniques to compare a 3D face to a 2D image, or a 2D face to a 3D image, and/or to engage in the multi-analysis discussed herein.

In short, data acquisition (also referred to as enrollment if done by agreement with a subject), either for the comparative/enrollment data, or for the identification data, may indicate to hardware that several snapshots that represent the individual from different angles are to be performed from different angles. This can allow either an overlay of the snapshots to form a 3D comparative image, or can result in selection of a given 2D image in the variety of captures for a comparison (such as using a pose-estimation algorithm applied to each of the 2D images). In either case, the key base points referenced above may serve as comparison points for switching between 2D and 3D.

In each such case, the best angle may be used to compare a pair of images, and the comparison may be defaulted to 2D methods, such as to limit processing power needed. That is, 3D comparison/enrollment data and/or 3D identification capture data may be devolved into 2D data.

Pose estimation may be solved using a variety of solutions known in the art, integrated with the ML model disclosed herein. For example, Perspective-n-Point (PnP) uses a set of 3D points in the world and their corresponding 2D key base image points in the image to estimate a pose. Similarly, pose estimation may not only remedy a lack of data or off-angle data, but may also allow for estimation of absent data, such as in the event of an obstruction of a portion of the face.

More generally, in order to estimate the pose, or missing portion, of a face in a camera, a generic 3D estimation model may be used. A proposed model employed in the disclosed ML/Multi-analysis model may be based on six facial landmarks, with the tip of the nose as the center:

1. Tip of the nose: (0.0, 0.0, 0.0)
2. Chin: (0.0, −330.0, −65.0)
3. Left corner of the left eye: (−225.0, 170.0, −135.0)
4. Right corner of the right eye: (225.0, 170.0, −135.0)
5. Left corner of the mouth: (−150.0, −150.0, −125.0)
6. Right corner of the mouth: (150.0, −150.0, −125.0)

The camera or object pose is defined by 6-DoF (degrees of freedom)—namely 3 rotation angles and 3 translation coordinates. Of course, ones of these points may be missing from the data, such as in the event of an obstruction, so an estimation algorithm may be employed to fill in missing data.

Moreover, the foregoing algorithm may be employed iteratively. That is, an initialization point may be given; and thereafter, each live pose estimation may be iteratively performed using the immediately previous frame pose values. This additionally helps to avoid noisy estimations of data values. Consequently, for every frame in the model, facial landmarks are detected in the image and this data, in conjunction with the previous frame's pose value, are used to estimate the pose, notwithstanding obstruction of any consequently unavailable key point features.

Figure 3:
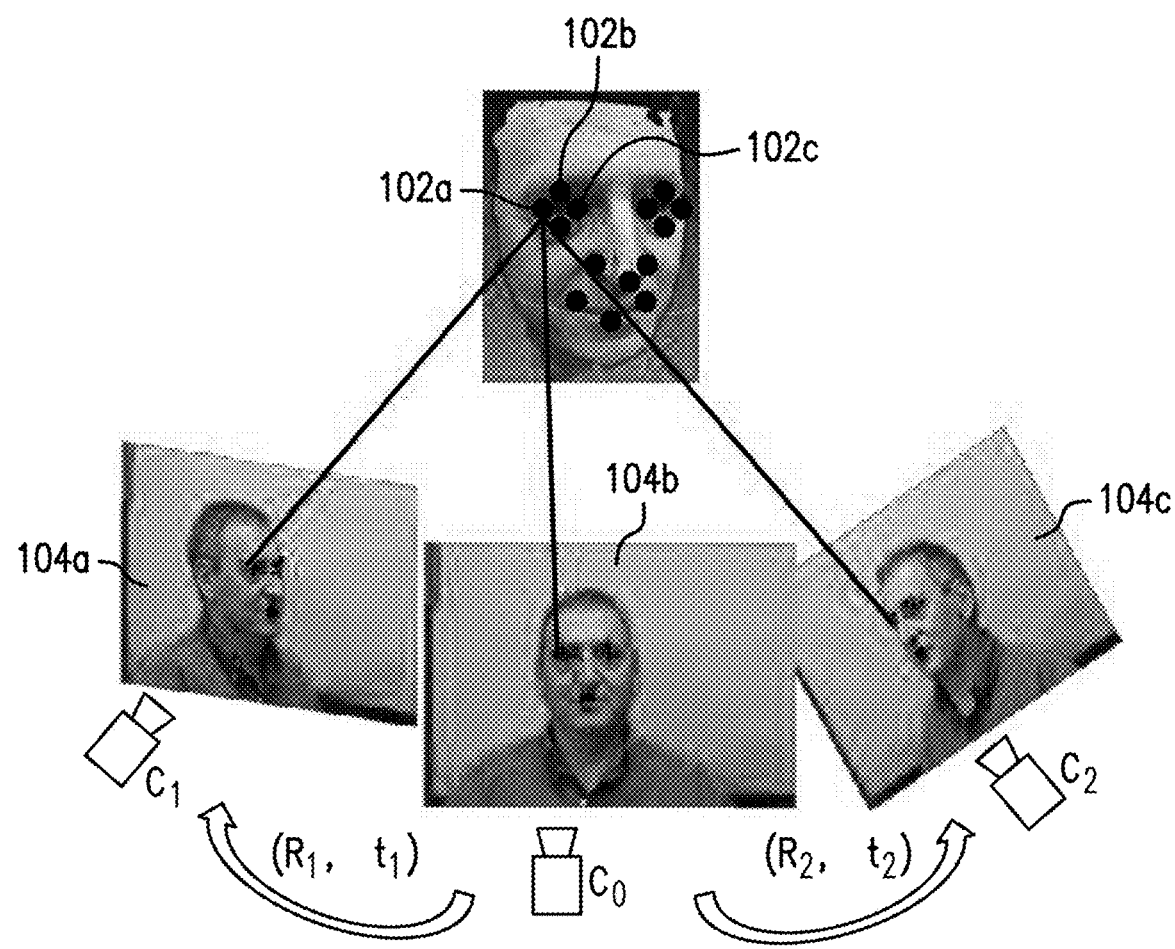
FIG. 3 is an illustration of an aspect of the embodiments.
Figure 5:
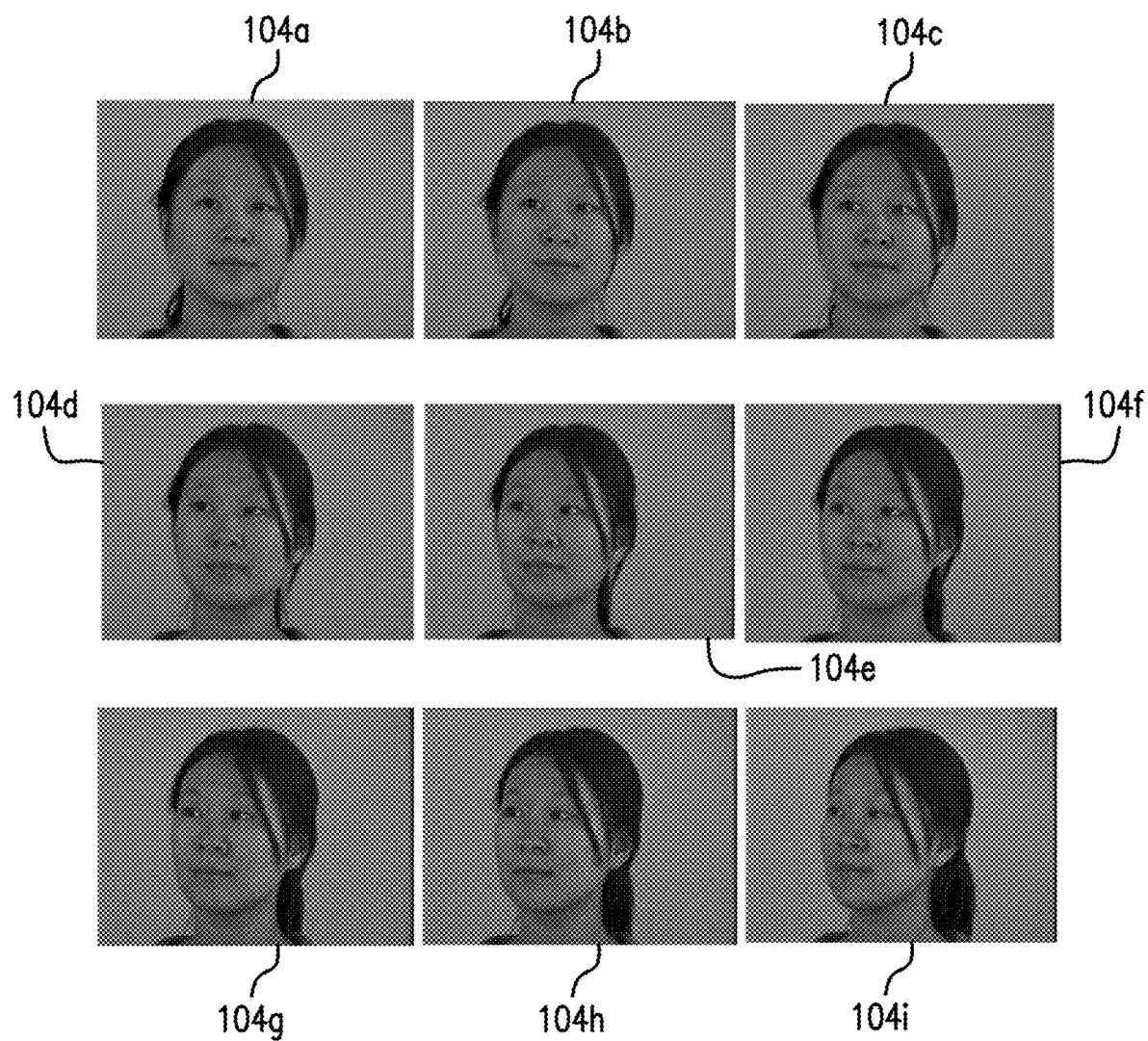
FIG. 5 is an illustration of an aspect of the embodiments.

For example, a pose model may be evaluated using an annotated dataset of images with the corresponding yaw angle included. Alternatively, yaw, pitch and roll angles may be monitored. Variations in a 2D image pose (Rn in FIG. 3) assessed in a pose model 104a, b, c, d, e, f, g, h, i, such as by using the face key point analysis referenced above in FIG. 3, is illustrated in FIG. 5.

A model may be further refined by multiplying each dimension with a coefficient. For example, the model discussed above may be modified as:

1. Tip of the nose: (0.0, 0.0, 0.0)
2. Chin: (0.0, −352.49699957, −127.16205301)
3. Left corner of the left eye: (−225.0, 170.0, −135.0)
4. Right corner of the right eye: (225.0, 170.0, −135.0)
5. Left corner of the mouth: (−109.32532051, −151.39402714, −104.44933297)
6. Right corner of the mouth: (109.32532051, −151.39402714, −104.44933297)

Figure 6:
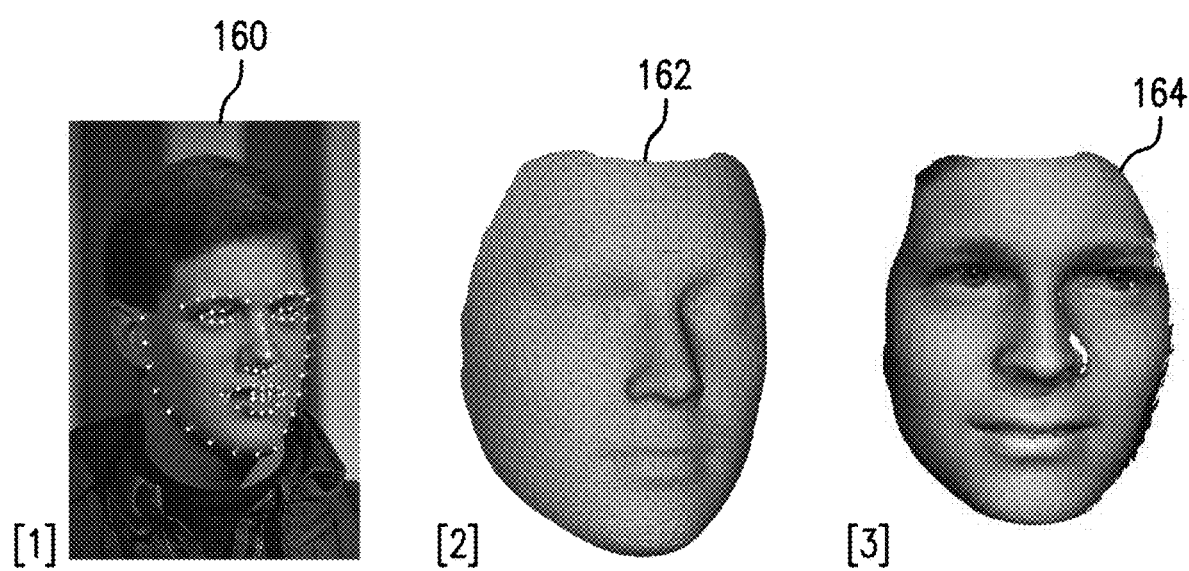
FIG. 6 is an illustration of a processing system.

Algorithmically, the embodiments may use the foregoing to generate a 3D model from a set of 2D images, even in circumstances where those 2D images are obtained from a video sequence. The system maps available data points on the 2D picture with points on a 3D shape model using the following steps: detecting a set of points on the 2D image 160; mapping key points in the face with points on a 3D mesh 162; and receiving the result of the obtained 3D face and mapping the 3D mesh to it 164. Thereafter, an estimation algorithm may use the 3D mesh overlay to estimate missing data, i.e., to estimate obstructed or off-angle portions, such as those features covered by a mask 166 [DRAW IN]. This is illustrated in relation to FIG. 6.

An enrolled identity represents an individual person and can be used as either a search parameter or included in a set of identities as an identity being searched for. The embodiments may include a camera rig to enroll the data, which ensure quality data sets and which provide a standardization of identities.

More specifically, a camera rig may provide cameras positioned in a way to allow multiple angles of video providing the enrollment process with a diverse pool of embeddings drawn from the frames of the video. Such a rig may, for example, provide for a voluntary enrollment, may form a part of the application process for government identification (i.e., government clearances, passport, driver's license, etc.), or may form part of a private identification system (i.e., an employee ID).

The camera rig system may be communicatively associated with a high quality network suitable for streaming of video, and with one or more user interfaces (UI) that may be local and remote.

The UI may be presented, at least in part, by a camera server, and the UI may provide, in part, control over focus, zoom, and quality, and the camera server may additionally have associated therewith an API to allow for the foregoing aspects.

Figure 7A:
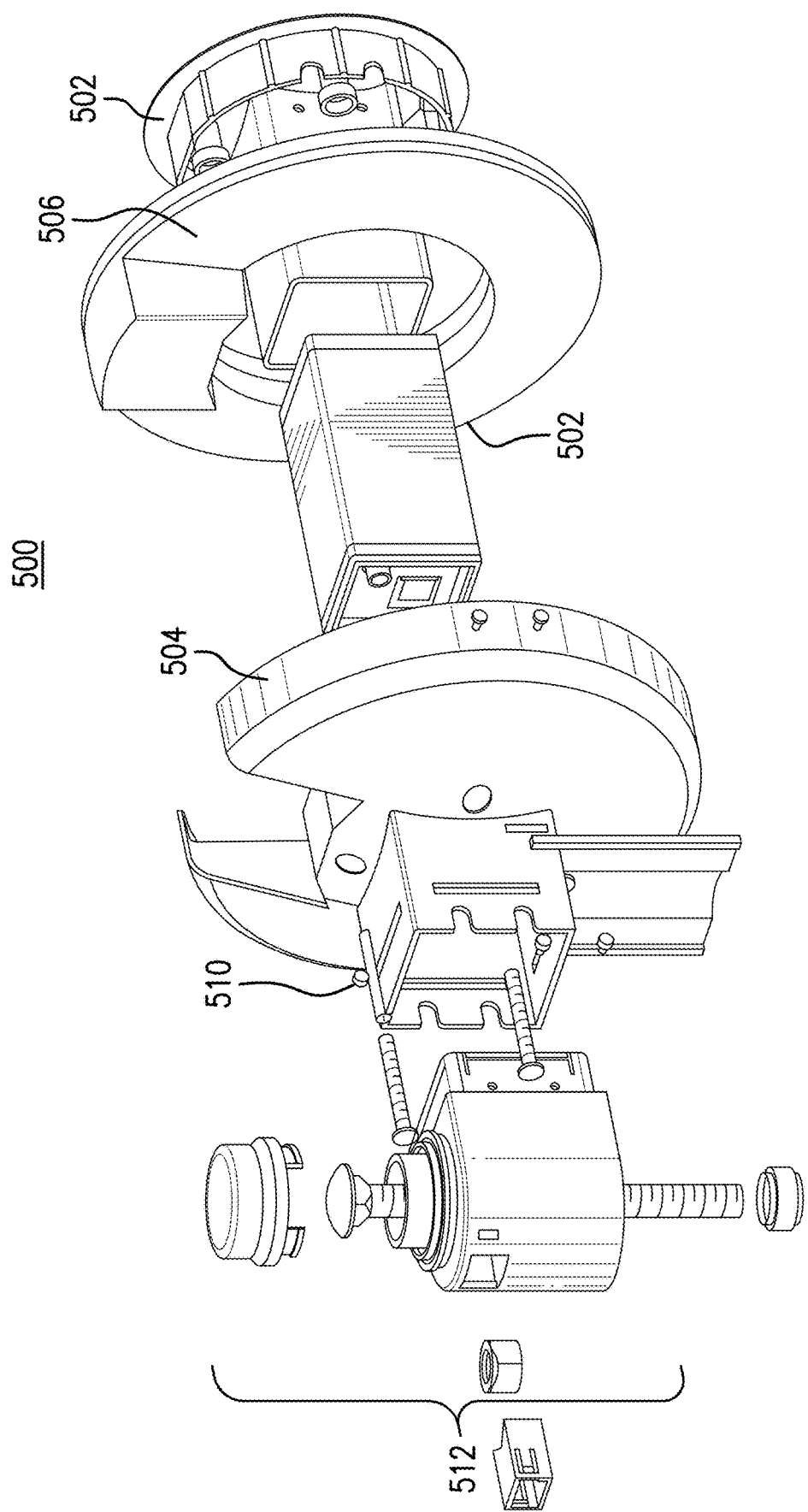
FIG. 7A illustrate aspects of the embodiments.
Figure 7B:
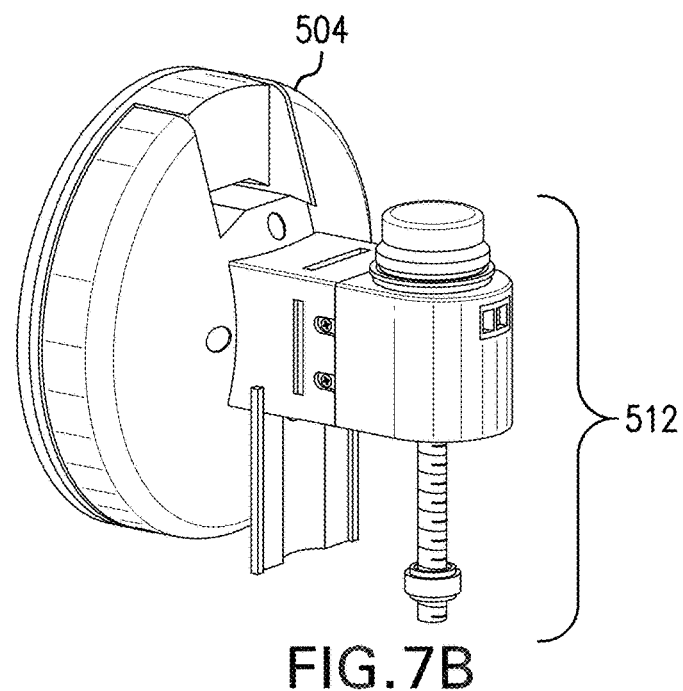
FIG. 7B illustrate aspects of the embodiments.
Figure 7C:
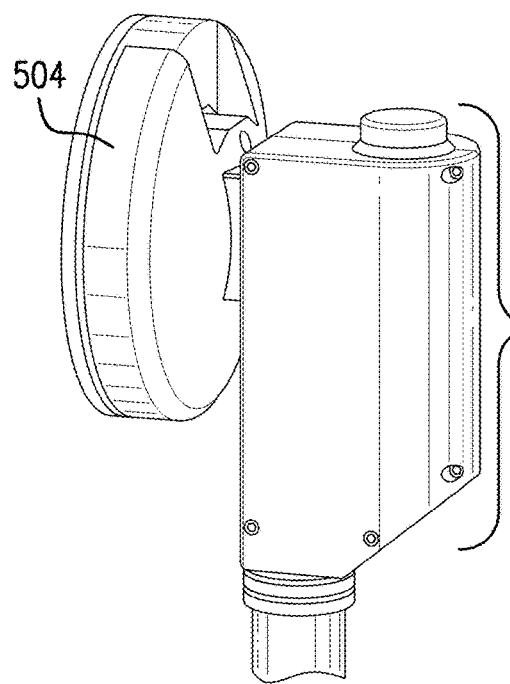
FIG. 7C illustrate aspects of the embodiments.
Figure 7D:
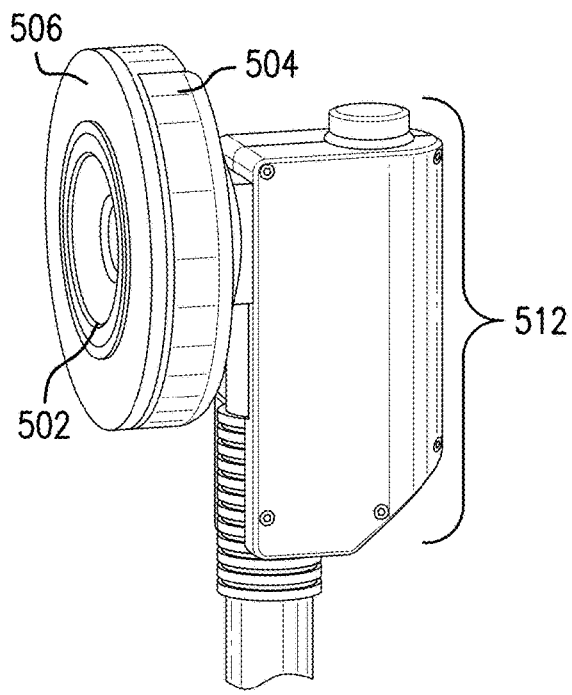
FIG. 7D illustrate aspects of the embodiments.

FIGS. 7A, 7B, 7C, and 7D illustrates an individual camera 500 that may be associated with the disclosed rig. Illustrated are a camera aspect 502, which may be embedded within a housing 504 that may also include lighting 506, such as LED ring lighting, and a rear camera housing 510 that physically associates with a (manually or automatically) adjustable mount 512. The adjustable mount may allow for rotational adjustment of camera angle, and a height adjustment of the camera. Also included may be power and signal lines running to at least the camera aspect, the lighting, and the adjustable mount. FIG. 7A illustrates the referenced camera in breakout view, and FIGS. 7B-7D illustrate the assembled camera assembly.

Figure 8A:
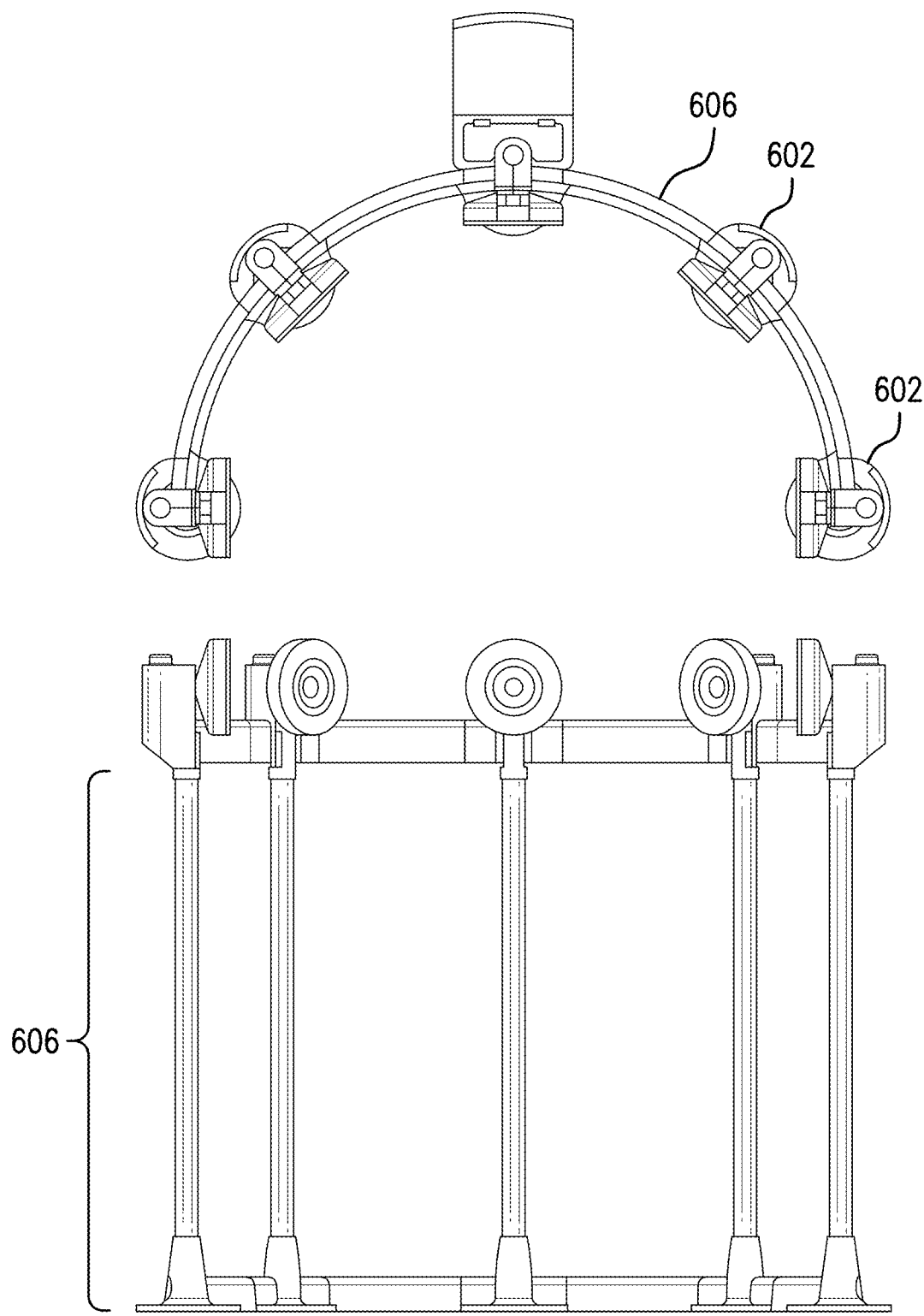
FIG. 8A illustrate aspects of the embodiments.
Figure 8B:
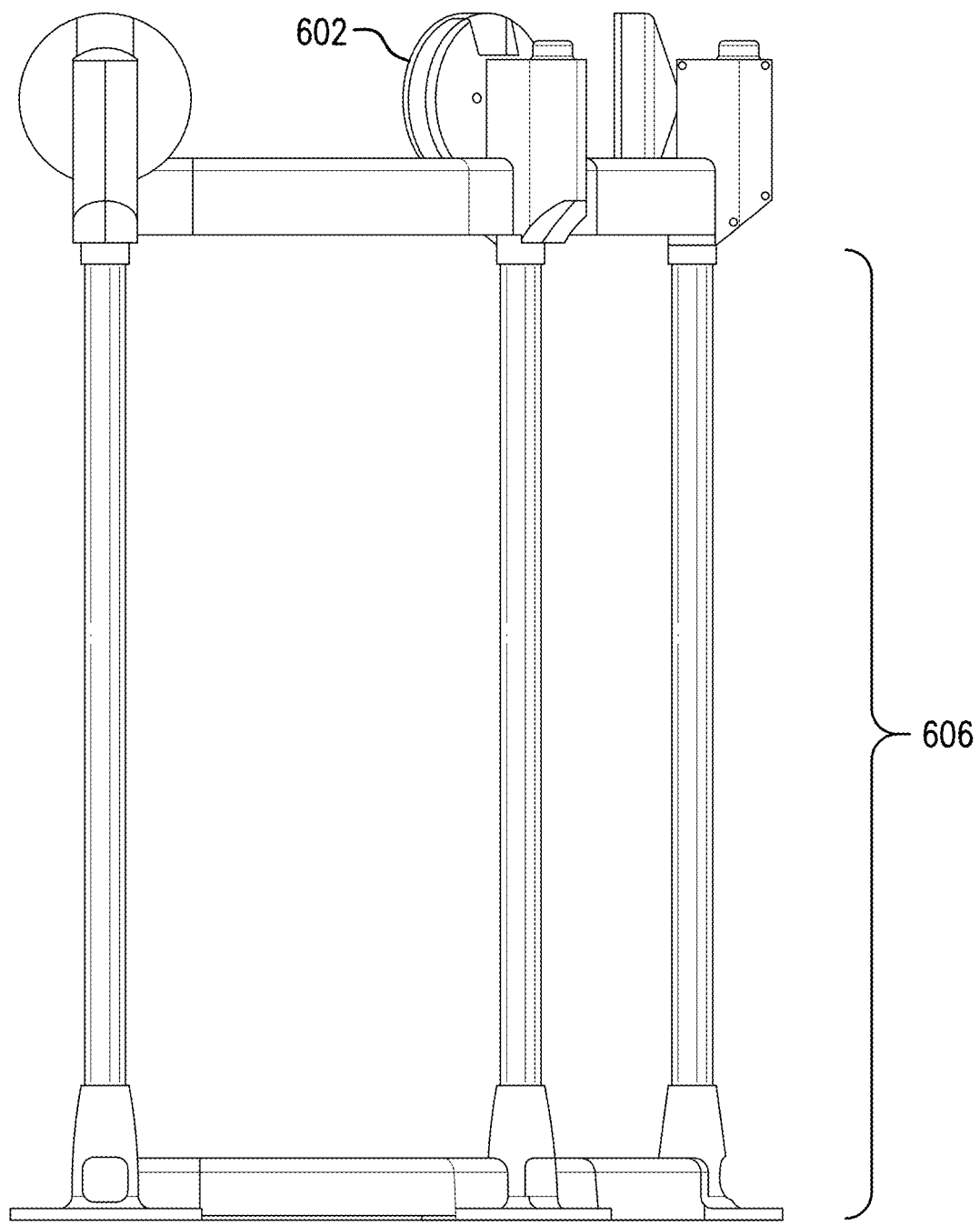
FIG. 8B illustrate aspects of the embodiments.
Figure 8C:
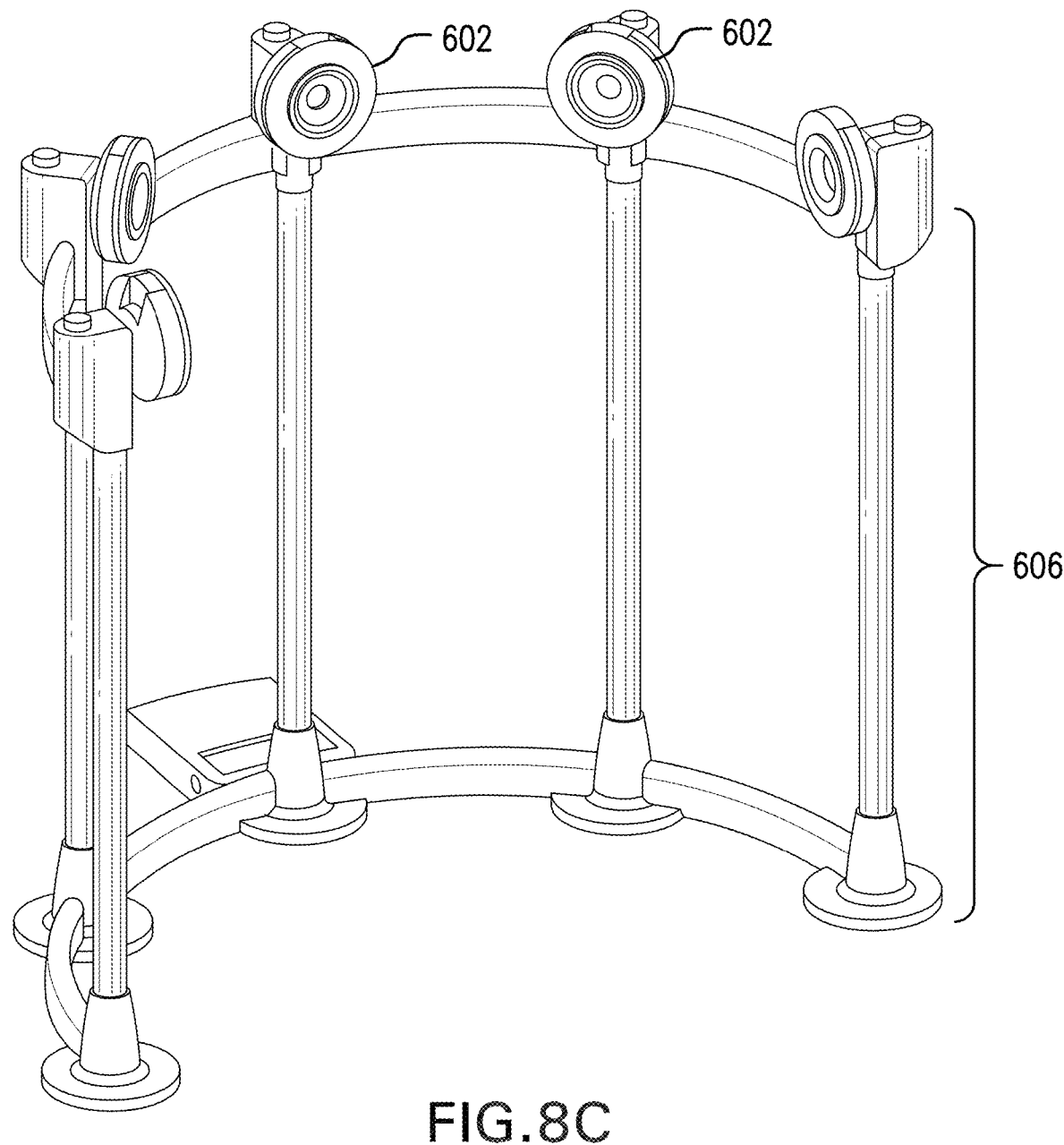
FIG. 8C illustrate aspects of the embodiments.

FIGS. 8A, 8B and 8C illustrate the cameras 602 illustratively provided in FIG. 7 connectively associated with a camera rig 606. The camera rig 606 may provide interconnection of the individual cameras 602 to the aforementioned camera server, UI, and/or network. The imaged subject may be placed at the approximate center point of the field of view of the cameras illustratively shown.

Figure 9A:
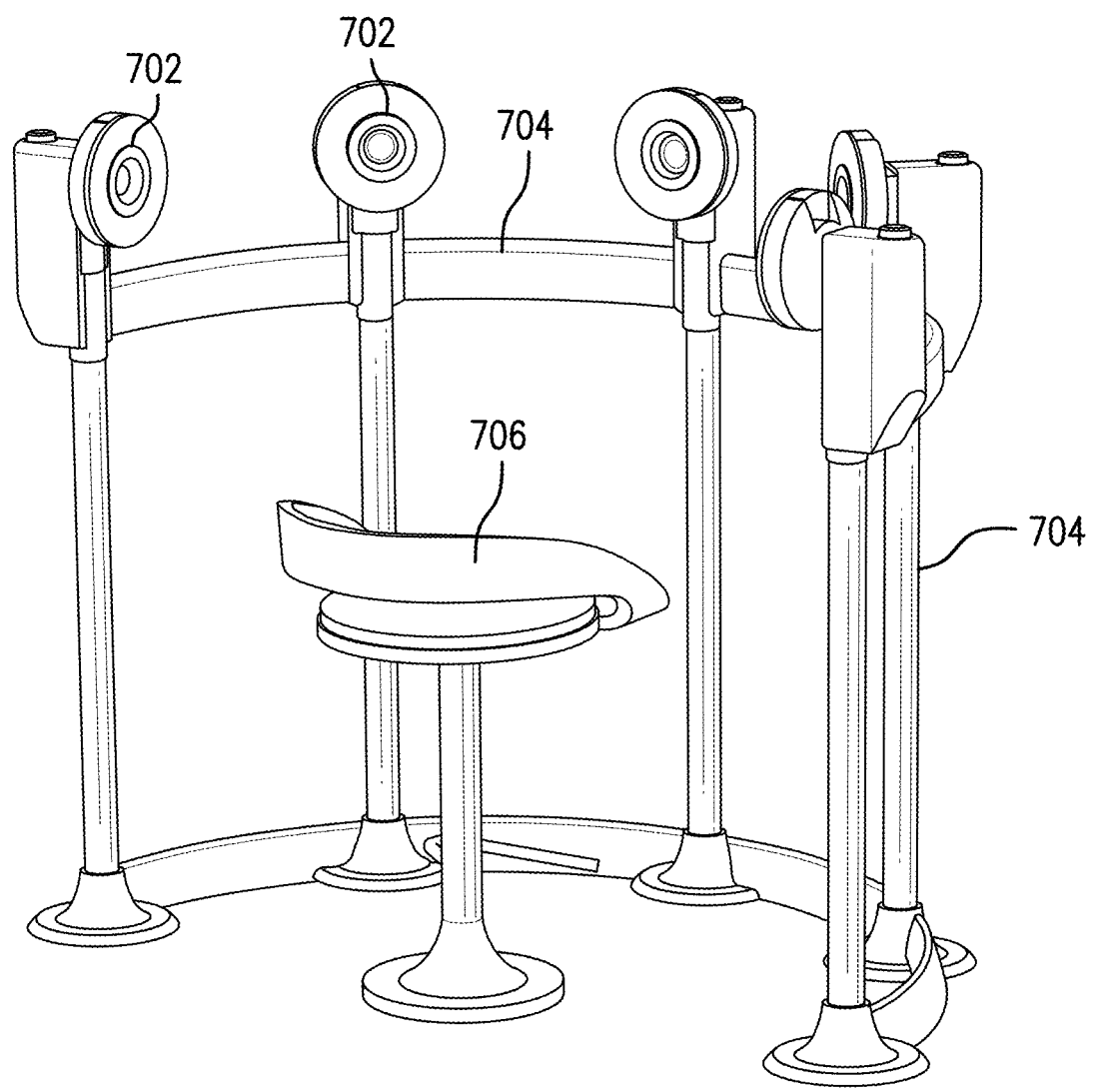
FIG. 9A illustrate aspects of the embodiments.
Figure 9B:
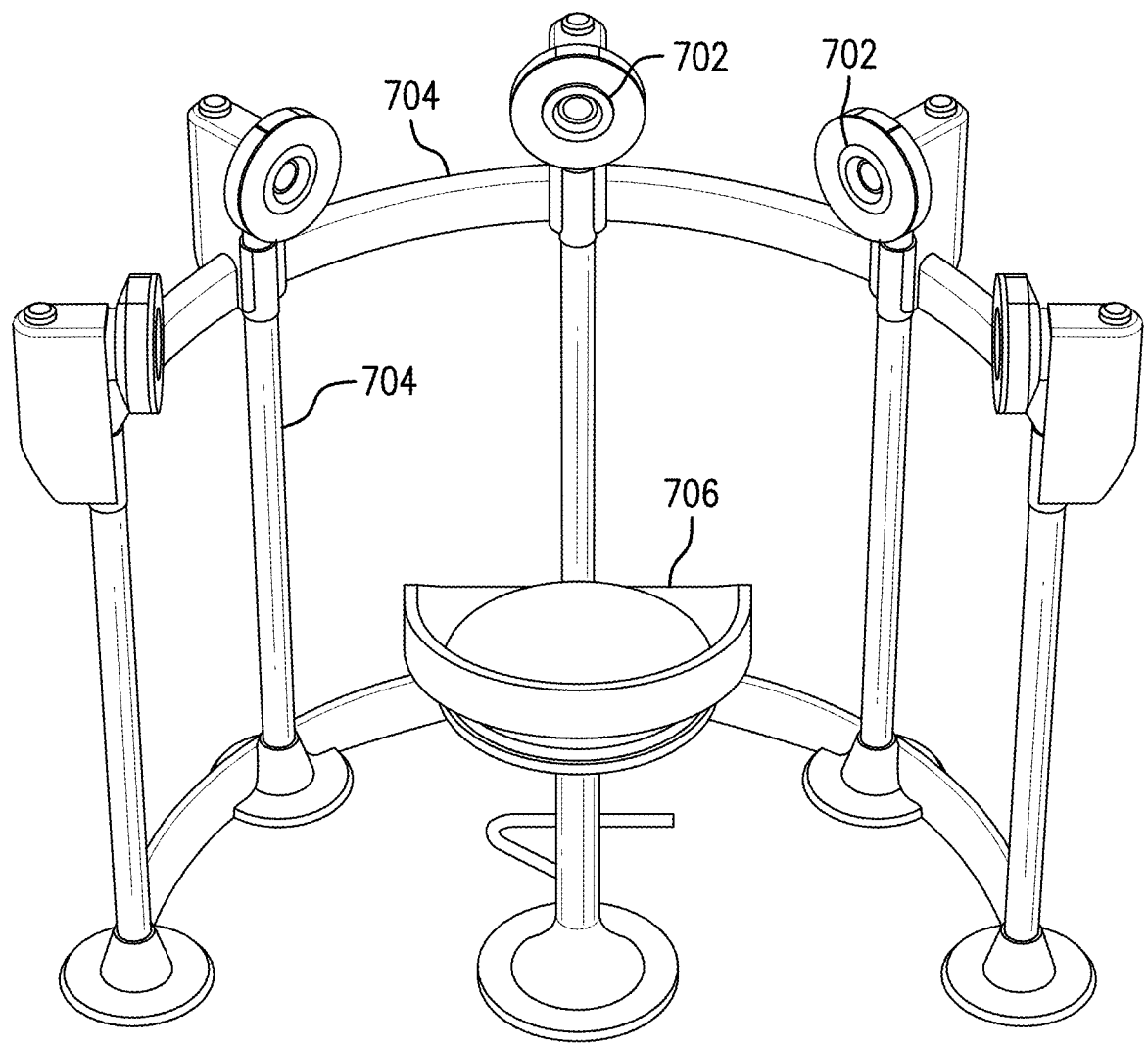
FIG. 9B illustrate aspects of the embodiments.
Figure 9C:
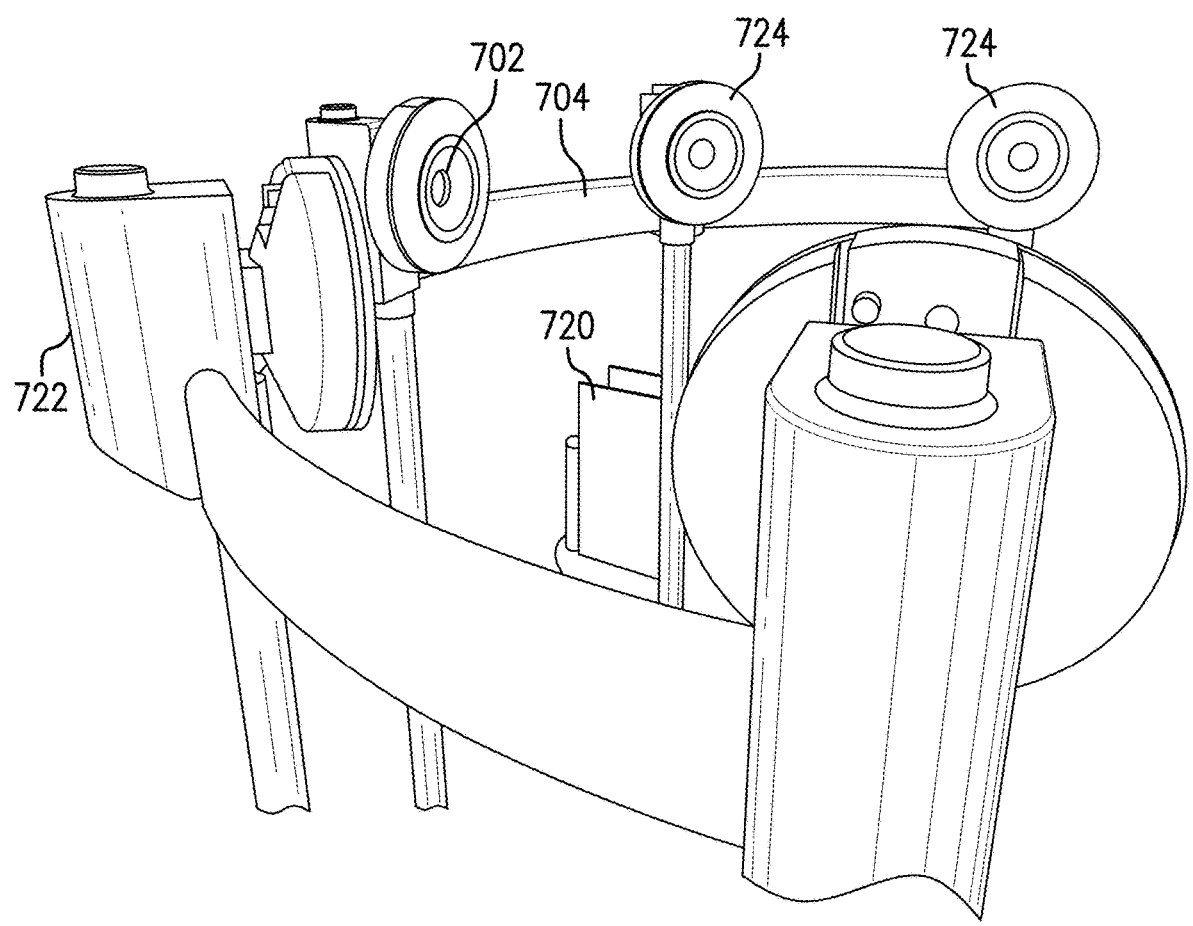
FIG. 9C illustrate aspects of the embodiments.

FIGS. 9A, 9B and 9C illustrate an assembled plurality of cameras 702 atop a rig 704, and the image subject having a seating location 706 at the centerpoint of the combined fields of view of the plurality of cameras. Further illustrated with particularity in FIG. 9C is an association of the camera rig 704, and hence of the individual cameras 702, with a camera server 720. The adjustable height 722 and lighting 724 from the camera rig 704 allow for maximum detail extraction and optimal lighting for different height and skin tone/posed individuals.

In order to establish a definitive result for identification, the disclosed multi-analysis may reduce the size of data sets. Data processing may be further reduced by manually or automatically filtering identities based on known characteristics of the individual. Filtering characteristics may include gender, race, age, and geolocation. Given that not all identities are enrolled (i.e., anonymous identities don't have known characteristics), the foregoing may be limited to enrolled individuals. However, for example, because video locations may be known/assigned, geolocation can be consistently used to more easily find local identity matches for anonymous identities.

Moreover, results are improved in the disclosed multi-analysis ML model by providing different "identities" for the same person/identity. For example, a person may be enrolled at age 20, and have the aforementioned key points (i.e., the embedding distance function) used to age that enrolled person, such as to age 30, 40, and/or 50.

A further method of reducing the size of the identification set is through group indentities, i.e., hierarchical categorization. Identities, whether enrolled or anonymous, may be assigned to groups having certain characteristics, which may allow for selective searches and/or the generation of categorical watchlists. An identity can belong to multiple or as many groups as required.

Figure 10:
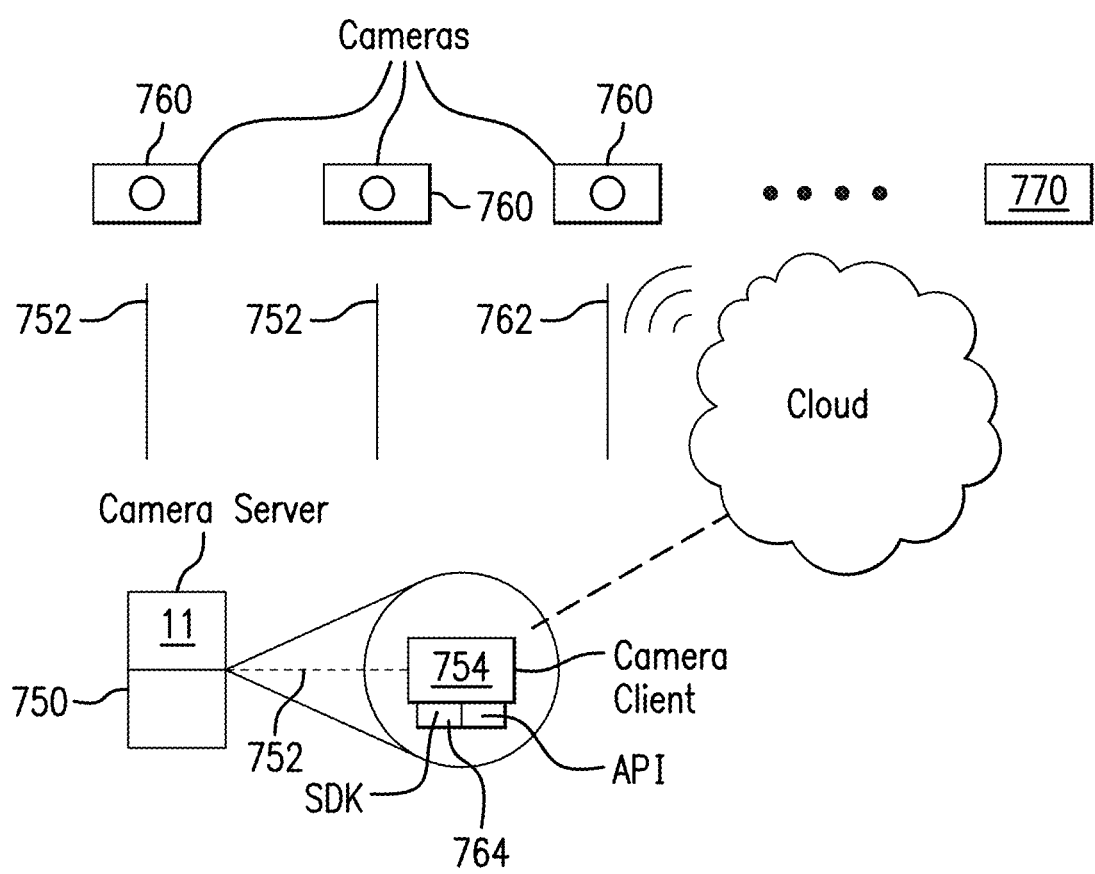
FIG. 10 illustrates aspects of the embodiments.

As referenced above and as illustrated in FIG. 10, a camera server 750 may obtain (or receive, such as from a third party feed in the cloud) comparative image data 752. As such, a software component "camera client" 754, such as a C++ component, may handle low level communication with a specific camera or cameras 760 and/or data feeds 762, to expose a video stream. An SDK 764 may offer an open source framework for video processing and general purpose streaming.

The server (or servers) 750 acts as an intermediate discovery node between web clients 770 and camera clients 754, allowing them to establish a real time communication for commanding cameras and obtaining a video stream. All generated data from cameras or third party streams, such as videos, log files, etc., may be available through an HTTP simple interface.

For application of a clustering algorithm, the video is run through a multithreaded video processing pipeline with each frame being processed by the disclosed FRS. The process steps may include: uploading a video to the server for processing; returning a unique identifier for the client to check elapsed time and processing time remaining; background processing to minimize FRS processing; detecting, frame by frame, all the faces in the video and embedding the data, yielding a set of N embeddings with 1,024 values in each; using a scan library, separating the faces into clusters, wherein each cluster may have, at a minimum, 6 "matching" faces from other frames in the video; classifying faces that don't belong to a cluster as "noise values" and placing them into a separate cluster (in case the client still would like to search through these values); and placing separated clusters of faces as anonymous identities that are enrolled in the system but not corresponded to an enrolled identity.

Identification is the parallel process of matching an identity (enrolled or anonymous) to a set of N other identities. Thus, anonymous identities may be handled as enrolled identities, but to keep the data sets clean of potential bad quality faces, the two types of identities, i.e., matched or anonymous, may be data-separated. It should also be noted that the accuracy of the algorithm is valid until a point at which the possibility of a FA (false acceptance) is inevitable.

Specifications or filters of characteristics may be used in comparing identities against a larger set, such as enrolled or previously-assigned anonymous identities, such as in order to minimize processing time and resources. The filters also may improve accuracy in gaining a correct match for an individual, such as across multiple cameras across a large facility, such as an airport. By way of example, filters may be automatically and/or hierarchically applied, such as wherein a first filter may limit the search comparison by skin tone, hair color, eye color, facial hair, distinct facial features, etc., in order to streamline the comparison process. Likewise, other biometric characteristics, such as temperature (with use of IR cameras), height, intimate group size, and so on may be used to streamline the data analysis necessary to "track" an individual.

However, videos being uploaded may or may not contain certain information, i.e., may be black and white instead of color, may lack sufficient background information to assess size, and so on. To address this, a collection may be created that contains multiple videos and allows for the searching of and for specific media and/or data resources, rather than narrowing a search by filter characteristics, and may or may not allow for comparative filters, i.e., all persons above a certain temperature, or all persons having a height above a certain background advertisement for a particular camera angle. A collection may also be searched by time, or by other aspects related to features other than the appearance of the subject(s) of the video(s).

In order to determine if an identity matches an enrolled or anonymous identity, all the embedded aspects of identities may be compared against embedded aspects found in the video resource. A comparison between two embeddings yields a data-distance. Various formulas can be applied to these "distances" to determine whether an identity is a match or not (e.g. mean, median, or minimum distance, for example) within a predetermined threshold.

A threshold acts as a minimum qualifying distance to indicate a good result. As such, thresholding also helps to clearly identify if a match is in the set N, rather than or in addition to providing a best result.

In conjunction with the distance comparison, identification may take the cluster results as a set, and attempt to assign a target identity's embedding to an anonymous identity. This predictive method can determine whether a face belongs to a particular cluster of faces.

Figure 11A:
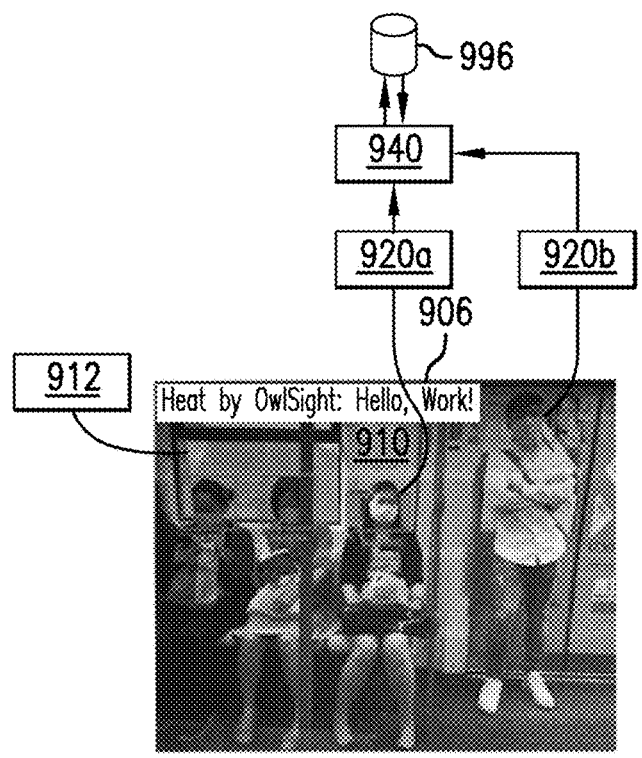
FIG. 11A illustrates aspects of the embodiments.
Figure 11B:
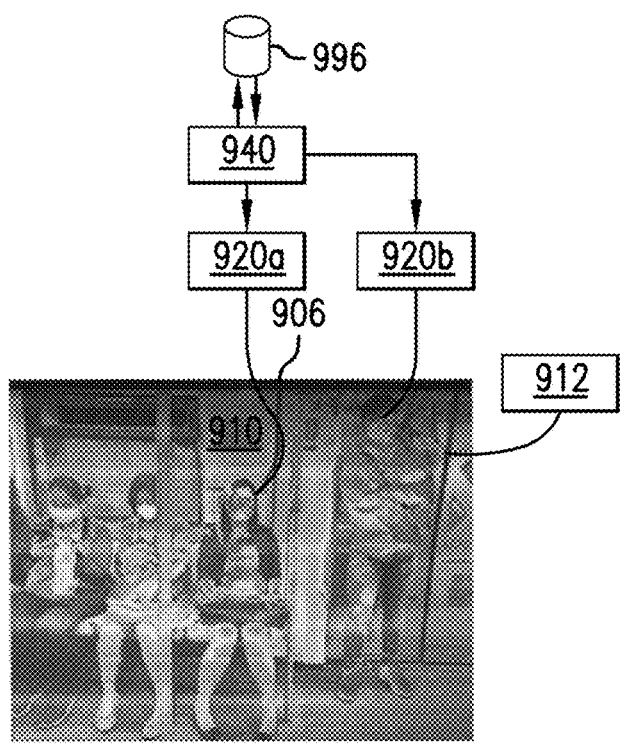
FIG. 11B illustrates aspects of the embodiments.

FIGS. 11A and B, and 12 illustrate the use of both a video camera 904 and an IR camera 906 in a certain high-traffic location 910, such as in an airport or on a train. The thermal and optical cameras may or may not be synchronized, i.e., each frame of the optical image may be correlated to a frame in the thermal image. Further, the disclosed system may be "tuned" such as by using localized environmental data 912. For example, by capturing information from the environment (i.e., humidity and temperature), obtained thermal data may be adjusted, and the camera data output re-calibrated.

Figure 12:
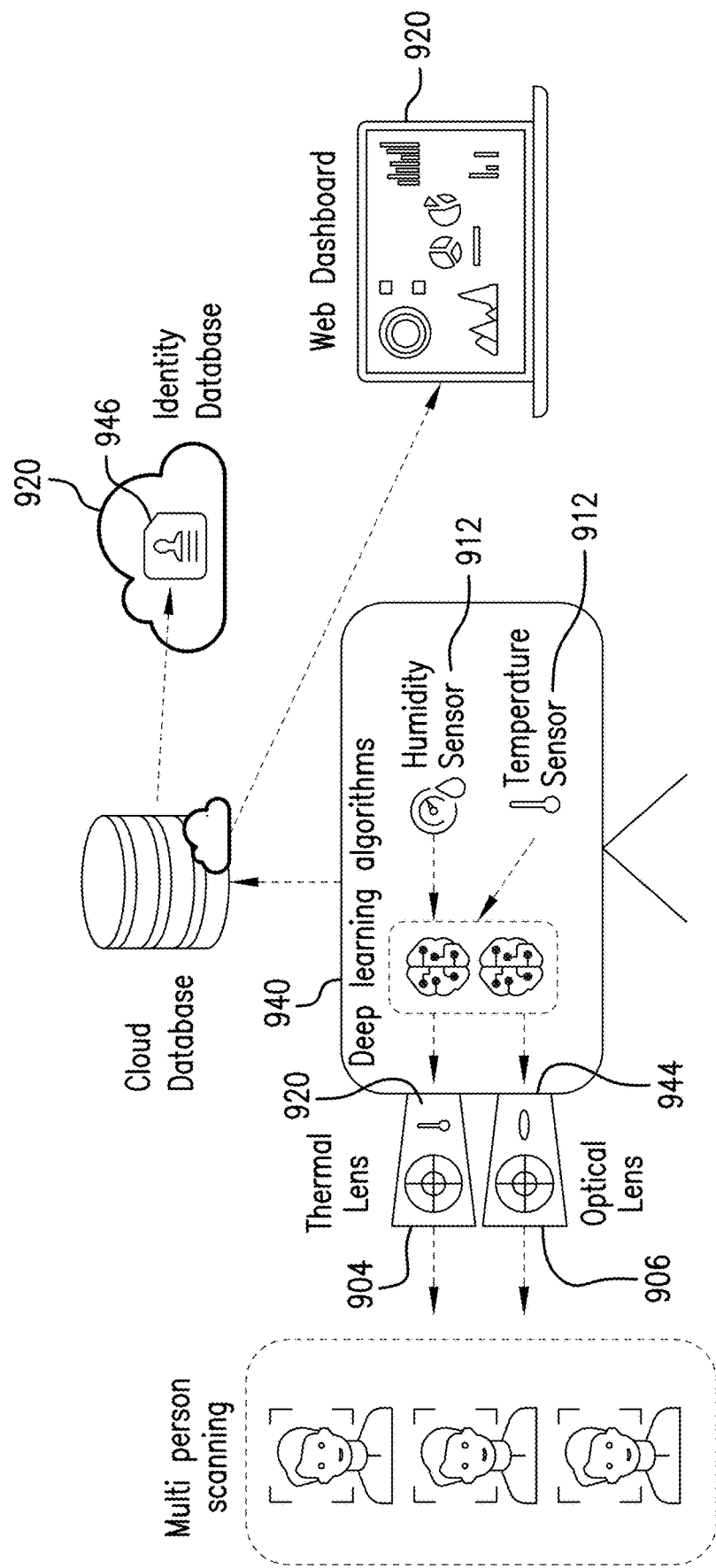
FIG. 12 illustrates aspects of the embodiments.

In the illustrations of FIGS. 11A and B, and FIG. 12, and using the foregoing ML model and algorithms 940, either a matched or anonymous identification 920 may be assigned to each individual who passes by the visual camera sensor. Other data may be associated with that individual in an identification database 946, such as may include skin tone, eye color, estimations of obstructed features given measurements of perceived features, height, width, group size, and so on.

Moreover, the foregoing perceived visual data may be related, for the same identity (whether matched or anonymous), with not only other visual cameras, but also with other types of sensing, such as including the "sister" IR camera at the same location as the visual camera. Unlike a standalone infrared thermometer, the disclosed ML model infers how a higher temperature may distribute through the human body, such as to recognize certain patterns that may be indicative of certain conditions and illnesses. Needless to say, the information from the IR camera may also include other information related with the identity in the database, such as the temperatures of other people around that individual, as well as the temperatures of other members of that person's immediate travelling party.

Yet further, the foregoing data combinations allow for detection of not only fever and the identity of those affected, but also of: sneezing and coughing, to further understand risk level to surrounding persons; mask presence, to further understand risk level to surrounding persons; and age/gender of the individual and party members, to infer the level of risk for the infected person and his/her group.

The embodiments may also include alerts related to this data, such as by individual identities, by that individual's group, and/or by other persons contacted (such as for contact tracing). By way of example, a person having an elevated temperature, per the IR camera, may cause an automated alert, which alert will then identify that person (either by matching or by assigning an anonymous identity) using all system-data, identify his/her movements, identify his/her immediate group, and identify others with whom he/she came into contact. Thus, crowded areas, such as airports, hospitals and train stations, may use the embodiments to help quickly quarantine and contact trace unhealthy people, and thereby protect healthy people. As an example, if a patient with a fever were to walk into a hospital, she may be directed to isolation rather than to the waiting room. Thus, by applying real time fever detection, identification and contact tracing through multiple camera systems in several locations, future hotspots can be detected before they start, which helps quarantine areas more quickly, this saving lives.

Of course, so too are tracked the identities of those whom he/she contacts. Thus, the embodiments provide contact tracing of any person in a facility having an elevated temperature. Further, certain facilities, such as airports and hospitals, lend themselves to detailed contact tracing through the use of the embodiments, largely because most or all persons in such facilities must provide an identification—and thus the disclosed identification may be specifically matched, whether or not the person in individually enrolled using a camera rig, such as is discussed above. That is, the facial recognition disclosed herein may, in some contexts, particularly allow for linking with an external biometrics database (for instance, passports, visas, driver's license, etc.).

The skilled artisan will appreciate that the foregoing may not only be provided in an enterprise system, but may also be provided in a mobile device. For example, by attaching a thermal sensor, such as to the thunderbolt connection of a smartphone, thermal data may be captured. Thereby, a known or unknown individual proximate to the smartphone user may be subjected to a determination of whether that person has a fever.

Figure 13:
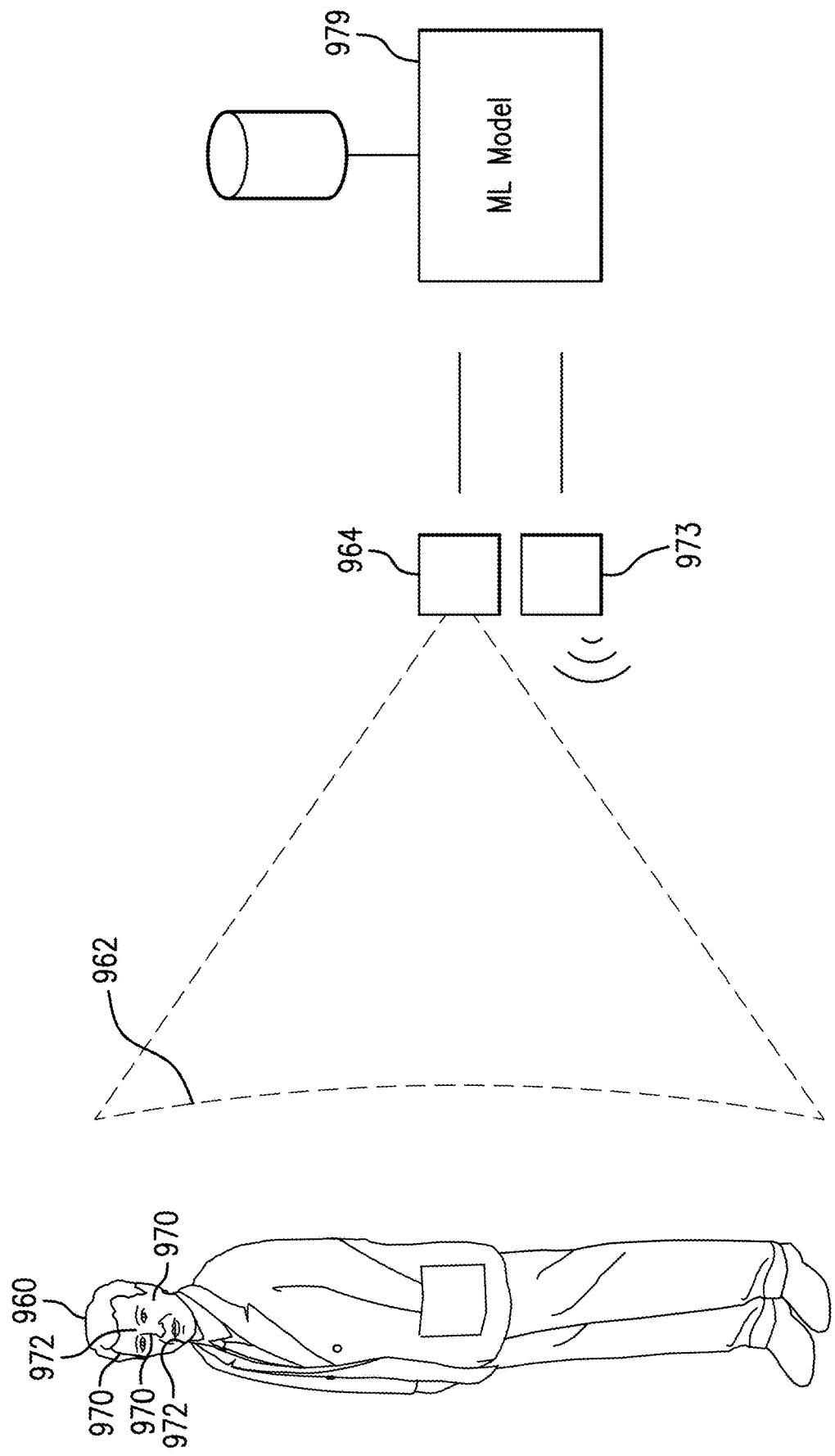
FIG. 13 illustrates aspects of the embodiments.

Whether the sensor pairing is provided at an enterprise level, such as across multiple sensing locations, or locally in a smartphone, FIG. 13 illustrates that, once the person 960 enters the targeted Field of View 962 (that is, presents a sense-able size), the face detection sensing 964 may detect landmark 970 and/or mesh features 970 for identification, and therefrom assess the target regions 972 of the face to be used for temperature estimation, ie., IR sensing 973. Because both the visual and IR sensing may be in correspondence, knowing the face landmarks in the optical image enables for suitable extraction of temperature data by the thermal sensor by targeting those target landmarks 972.

Figure 14:
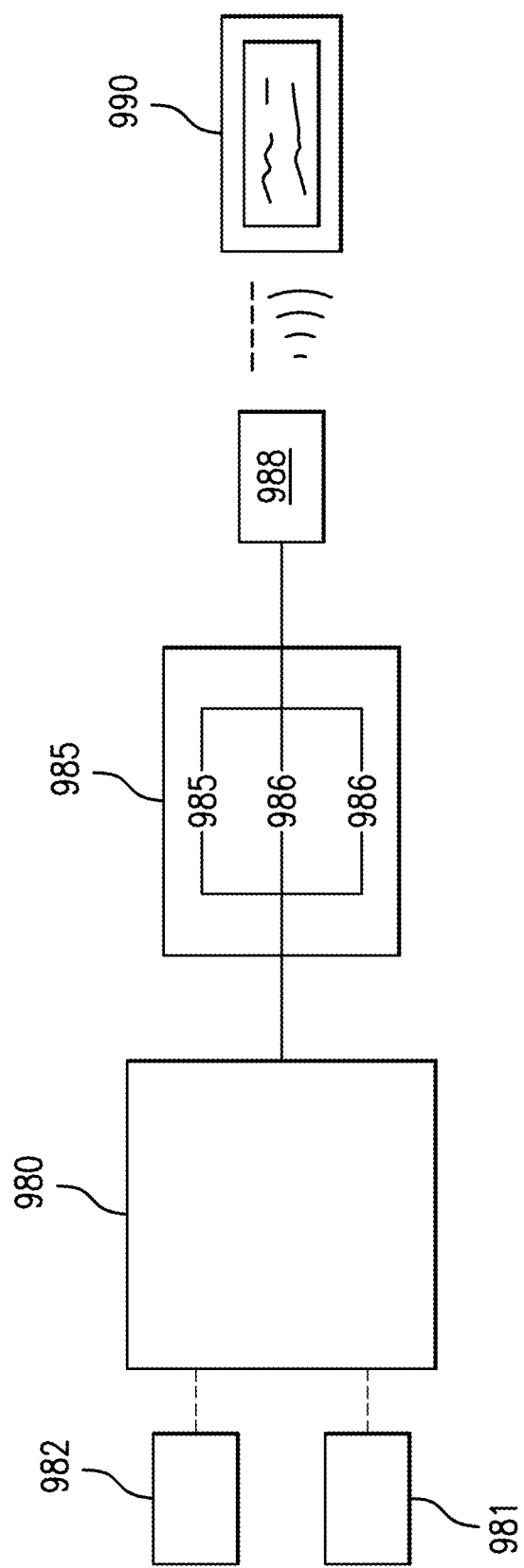
FIG. 14 illustrates aspects of the embodiments.

FIG. 14 illustrates a series 979 of subsystems capable of executing the embodiments of FIGS. 11A, B, 12 and 13. Included are a Capture API 980, which may capture both the thermal 981 and optical data 982 synchronously; a Processing Core Subsystem 984 that processes the thermal data 985 in conjunction with and convolved with other data 986, including the optical data; a Communication Sublink 988 that communicates processed data to a Dashboard 990; and the Dashboard 990 that presents the processed data received via the communications sublink, such as to a user.

The Capture API is responsible for interacting with both cameras. It may perform Camera initialization; Camera parameters setup; Camera frame pre-processing; Camera visualization output; Camera shutdown; and Camera calibration (noting that both cameras may be calibrated to have the same FOV).

The Processing Core Subsystem may process both the thermal and optical cameras continuously scanning the scene for new targets, and executing a Face detection module at each frame of the optical data. Once a face is detected, distance to the target is estimated and only faces within a reasonable distance are considered for thermal measurement processing. Once that person enters the targeted Field of View (that is, it has an acceptable size), a face detection feature (i.e., landmark detection) may be executed to obtain the regions of the face to be used for temperature estimation. Because both cameras are in correspondence, knowing the face landmarks in the optical image enables the system to also know the face regions in the thermal image.

The thermal information for each face is then extracted from the thermal data. The system may continue to run facial recognition, such as on any subjects displaying an elevated temperature, to track the person along all frames.

Each person may be stored in a database with all thermal information extracted from all frames of the scene. With this information a high-dimensional feature vector is built to characterize that person's temperature. The information is compared against the expected "normal" temperature, and, depending on a specified threshold, an alarm is issued if the temperature is up to that threshold.

The Communication Service is responsible for communicating the processed data (and, eventually, the corresponding alarms) to the Dashboard. Because the amount of data to be transferred is substantial, data transfer may be highly optimized way, as will be understood to the skilled artisan. The Dashboard may then present the communicated information.

Figure 15:
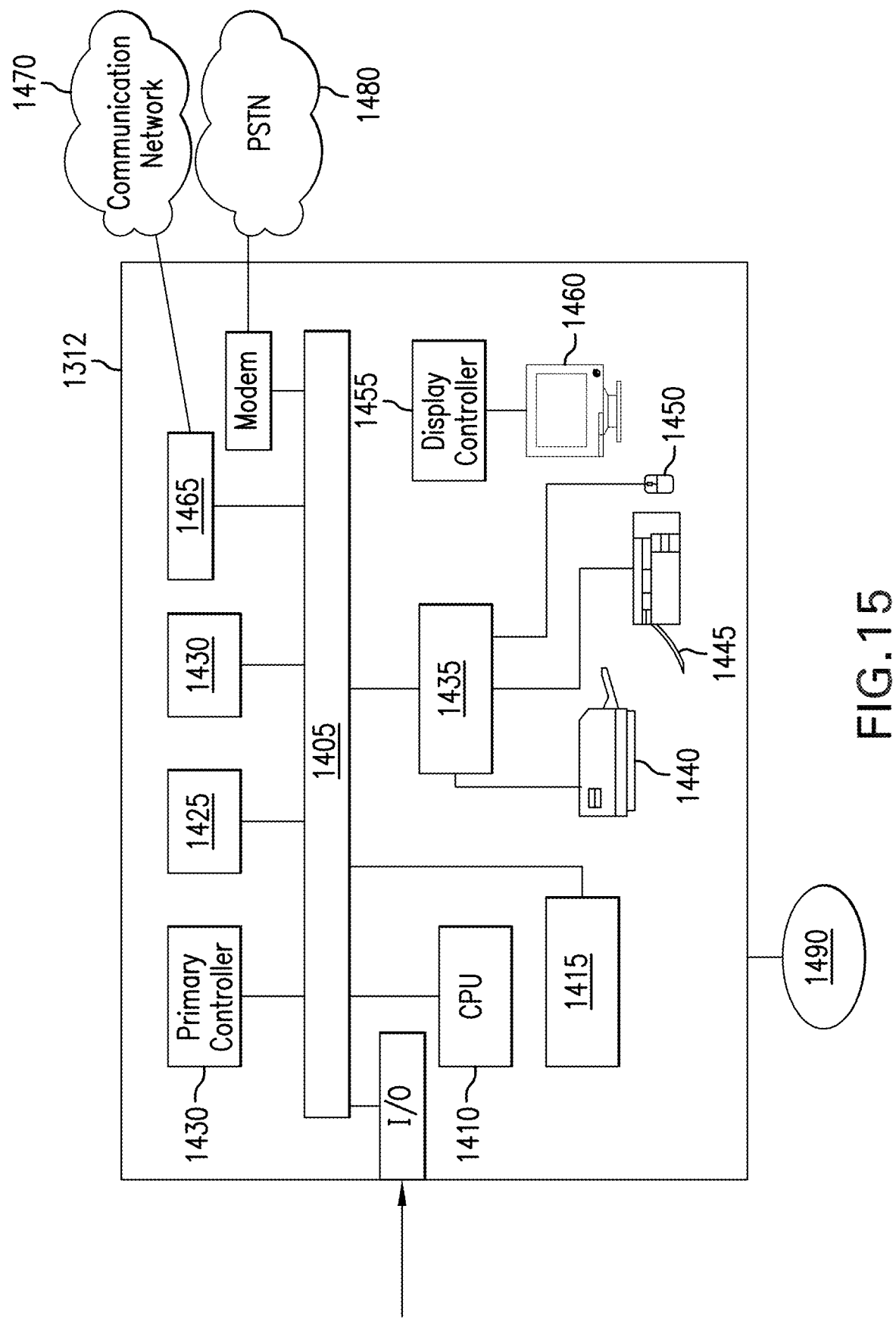
FIG. 15 illustrates aspects of the embodiments.

FIG. 15 depicts an exemplary computer processing system 1312 for use in association with the embodiments, by way of non-limiting example. Processing system 1312 is capable of executing software, such as an operating system (OS), applications, user interface, and/or one or more other computing algorithms/applications 1490, such as the recipes, models, programs and subprograms discussed herein. The operation of exemplary processing system 1312 is controlled primarily by these computer readable instructions/code 1490, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 to cause system 1312 to perform the disclosed operations, comparisons and calculations. In many known computer servers, workstations, personal computers, and the like, CPU 1410 is implemented in an integrated circuit called a processor.

It is appreciated that, although exemplary processing system 1312 is shown to comprise a single CPU 1410, such description is merely illustrative, as processing system 1312 may comprise a plurality of CPUs 1410. Additionally, system 1312 may exploit the resources of remote CPUs (not shown) through communications network 1470 or some other data communications means 1480, as discussed throughout.

In operation, CPU 1410 fetches, decodes, and executes instructions from a computer readable storage medium, such as HDD 1415. Such instructions may be included in software 1490. Information, such as computer instructions and other computer readable data, is transferred between components of system 1312 via the system's main data-transfer path. The main data-transfer path may use a system bus architecture 1405, although other computer architectures (not shown) can be used.

Memory devices coupled to system bus 1405 may include random access memory (RAM) 1425 and/or read only memory (ROM) 1430, by way of example. Such memories include circuitry that allows information to be stored and retrieved. ROMs 1430 generally contain stored data that cannot be modified. Data stored in RAM 1425 can be read or changed by CPU 1410 or other hardware devices. Access to RAM 1425 and/or ROM 1430 may be controlled by memory controller 1420.

In addition, processing system 1312 may contain peripheral communications controller and bus 1435, which is responsible for communicating instructions from CPU 1410 to, and/or receiving data from, peripherals, such as peripherals 1440, 1445, and 1450, which may include printers, keyboards, and/or the operator interaction elements on a mobile device as discussed herein throughout. An example of a peripheral bus is the Peripheral Component Interconnect (PCI) bus that is well known in the pertinent art.

Operator display 1460, which is controlled by display controller 1455, may be used to display visual output and/or presentation data generated by or at the request of processing system 1312, such as responsive to operation of the aforementioned computing programs/applications 1490. Such visual output may include text, graphics, animated graphics, and/or video, for example. Display 1460 may be implemented with a CRT-based video display, an LCD or LED-based display, a gas plasma-based flat-panel display, a touch-panel display, or the like. Display controller 1455 includes electronic components required to generate a video signal that is sent to display 1460.

Further, processing system 1312 may contain network adapter 1465 which may be used to couple to external communication network 1470, which may include or provide access to the Internet, an intranet, an extranet, or the like. Communications network 1470 may provide access for processing system 1312 with means of communicating and transferring software and information electronically. Additionally, communications network 1470 may provide for distributed processing, which involves several computers and the sharing of workloads or cooperative efforts in performing a task, as discussed above. Network adaptor 1465 may communicate to and from network 1470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. An identification and tracking system, comprising:
   a visual sensor;
   an infrared sensor synchronized with the visual sensor;
   a temporary identification assigner associated with the visual sensor and capable of assigning a temporary identification to faces perceived by the visual sensor;
   a facial feature assessment that applies a 3D mesh to the perceived faces to allow for the temporary identification, wherein the facial feature assessment assigns target zones of the perceived face that are suitably indicative of a body temperature of a person corresponded to the temporary identification;
   a body temperature assessment that uses the infrared sensor to assess the body temperature of the person corresponded to the temporary identification at the target zones; and
   an identification database that:
      corresponds the temporary identification with the assessed body temperature;
      non-thermally compares selected points of the 3D mesh of the temporary identification against a plurality of known identities;
      extracts confusion factors from the comparison based solely on a location of the selected points in the 3D mesh; and
      produces an identity match between the temporary identification and the plurality of known identities.

2. The system of claim 1, wherein the confusion factors comprise at least one obstructed facial feature.

3. The system of claim 2, wherein the obstruction comprises a mask.

* * * * *